United States Patent [19]

O'Riordán

[11] 4,192,084
[45] Mar. 11, 1980

[54] ATOMIC MODEL

[76] Inventor: Seán S. O'Riordán, Long La., Dublin Hill, Cork, Ireland

[21] Appl. No.: 612,581

[22] Filed: Sep. 11, 1975

[30] Foreign Application Priority Data

Sep. 17, 1974 [IE] Ireland .................................. 1923/74

[51] Int. Cl.² .............................................. G09B 23/26
[52] U.S. Cl. ...................................... 35/18 A; 35/7 A
[58] Field of Search ............ 35/7 R, 7 A, 18 R, 18 A, 35/27, 60

[56] References Cited

U.S. PATENT DOCUMENTS

| 1,100,362 | 6/1914 | Evans | 35/60 |
|---|---|---|---|
| 2,864,275 | 12/1958 | Fraleigh | 35/7 A X |
| 3,365,815 | 1/1968 | McCue | 35/18 A |
| 3,414,987 | 12/1968 | Lindenauer | 35/60 |
| 3,423,846 | 1/1969 | Arend | 35/7 A X |
| 3,846,214 | 11/1974 | Rosenzweig | 35/27 |

FOREIGN PATENT DOCUMENTS 805364  12/1958  United Kingdom ...................... 35/7 R

*Primary Examiner*—Harland S. Skogquist
*Attorney, Agent, or Firm*—Haseltine, Lake & Waters

[57] ABSTRACT

A teaching aid which has a display board and a number of discs having symbols printed thereon and magnets for attaching the discs to the display board. The teaching aid is particularly directed towards the teaching of chemistry and the discs have printed thereon atomic or ionic symbols and can be so used to display the theory of chemical bonding or construction of a nucleus.

2 Claims, 6 Drawing Figures

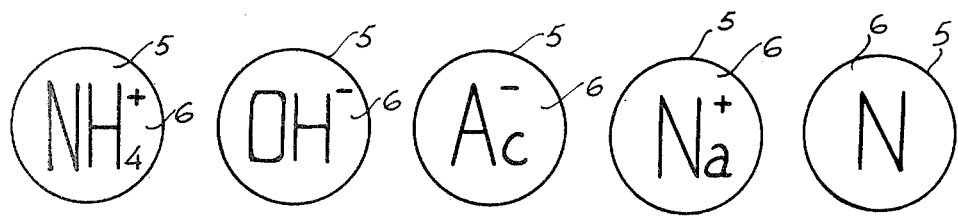
Fig.1
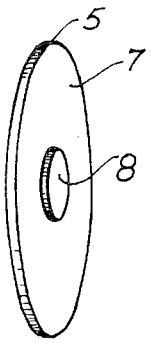
Fig.2
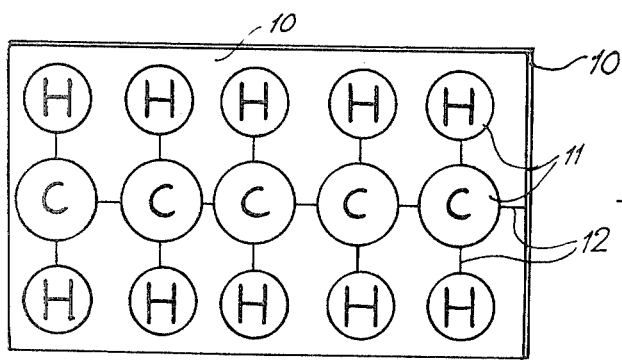
Fig.3
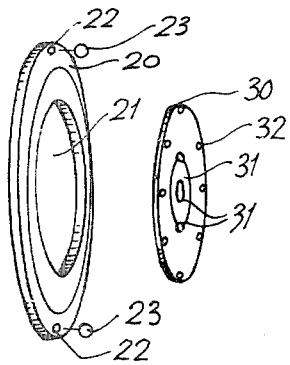
Fig.4
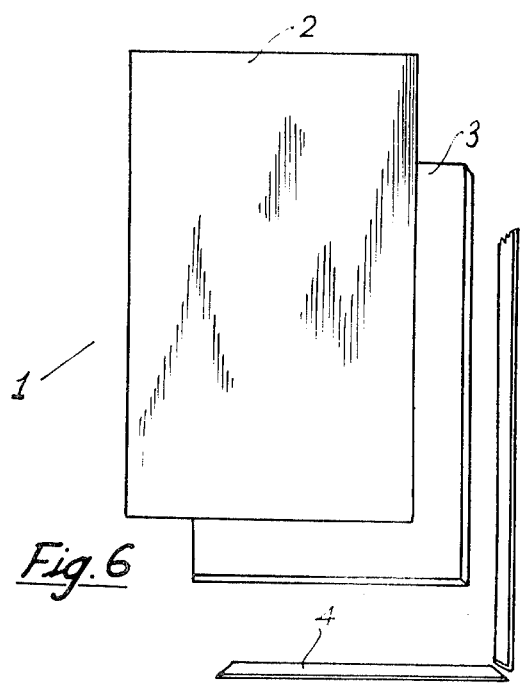
Fig.5
Fig.6

4,192,084

ATOMIC MODEL

BACKGROUND OF THE INVENTION

Introduction

The present invention relates to a construction of a teaching aid.

Field of the Invention

Teaching machines have been used extensively, their use being based on concept of behaviouristic learning theories and the principle of "conditioning" as envisaged by Pavlov in his famous experiments on animals at the end of the last century. Teaching machines have indeed proved successful in many branches of education. Their advantage undoubtedly lies in the skillful breakdown and organisation of a course into a series of steps, the responsibility for progress devolving upon the individual student. Unfortunately, in the ordinary school classroom, the pupil only gets a limited amount of opportunity to demonstrate his knowledge or grasp of a subject matter. For most of the time he has to be content with a passive listening role. The present invention is directed towards providing a teaching aid for a classroom which will improve the learning process and additionally will enable the student to take a more active role, without at the same time, being as costly to provide as the more conventional teaching machine.

SUMMARY OF THE INVENTION

According to the invention there is provided a teaching aid comprising a display board, a disc having a symbol printed thereon, and means for attaching the disc to the board.

In one embodiment of the invention particularly adapted to the teaching of chemistry the discs have printed thereon atomic or ionic symbols.

The main advantages to the present invention are, firstly, that the teaching aid is relatively simple to construct and can be adapted readily by a teacher for his or her own purposes; secondly, the teaching aid, according to the invention, allows the student to assume a more active role than has heretofore been possible.

BRIEF DESCRIPTION OF THE DRAWINGS

FIG. 1 is a plan view of a plurality of discs according to the invention,

FIG. 2 is a perspective view of one of the discs of FIG. 1,

FIG. 3 is a plan view of an alternative construction of disc according to the invention, FIG. 4 is a perspective view of a ring according to the invention, FIG. 5 is a perspective view of another construction of disc according to the invention, and FIG. 6 is an exploded partial view of a display board according to the invention.

Referring to the drawings and initially to FIG. 6 thereof there is provided a display board, indicated generally by the reference number 1, formed from a thin ferrous sheet 2 mounted on a backing board 3 of wood, plastics or other suitable material. The ferrous sheet 2 and backing board 3 are contained within a frame 4. Referring to FIG. 1 and 2 there is provided a number of circular discs 5 having a front face 6 and a rear face 7. The front face 6 of each disc 5 can be of various colours and has printed thereon a symbol. For example, the discs illustrated in FIG. 1 have printed thereon the symbols $NH^+_4$, $OH^-$, $Ac^-$, $Na^+$, and $N$. On the rear face 7 of each circular disc 5 is mounted a magnet 8.

Referring to FIG. 3 there is illustrated a rectangular disc 10 having printed thereon a number of circles 11 each of the circles in the example shown in FIG. 3 denotes a separate hydrogen or carbon atom, the whole denoting a molecule $C_5H_{10}$. The back of the rectangular disc 10 is provided with one or more magnets (not shown).

Referring to FIG. 4 there is illustrated a ring 20 having a cut-out circular portion 21 for embracing a disc 5. The ring 20 is provided with a number of holes 22 for reception of pins 23.

Referring to FIG. 5 there is illustrated a transparent disc 30 having a number of circles 31 printed thereon. Holes 32 are provided on the transparent disc 30. A suitable mounting magnet, not shown, is provided on the back of the transparent disc 30.

It will be appreciated that the printing on the discs, lettering, and/or colouring, may be so arranged as to make the symbol readily visible from all parts of the average sized classroom.

The use of the circular disc 5 and the rectangular disc 10 is readily apparent. These would be offered up to the display board 1 and would be held thereon by means of the magnets 8.

The rectangular disc 10 may be used to display the construction of a particular molecule.

The rings 20 may be used to embrace a disc 5 and a suitable number of pins 23 placed on them to show the construction of the various atoms or molecules.

To facilitate the demonstration of electron position and chemical bonding it is envisaged that small circular discs, for electrons, and small rectangular discs, for bonds, may be used. These would be either completely magnetised or provided with mounting magnets. For example a molecule could be readily built up on the display board 1 by use of the discs 5 and the recangular discs.

One suitable embodiment of the invention provides a display board of approximately 3'×2' in length with discs between $1\frac{1}{4}"$ and $2\frac{1}{2}"$ in diameter. It is also envisaged that a suitable case or carrying means may be provided.

The term "printed" when used in this specification includes any method of painting or printing. The "printing" of the symbols might conveniently be arranged by using pre-printed sheets of paper and affixing the sheets of paper to the disc. It will also be realised that the symbols may be drawn on the discs by the teacher, preferably with some form of easily erased marker.

It will be appreciated that scientific symbols other than the chemical symbols hereinbefore described may be used. Needless to say these would include representations of flasks, funnels, condensers, electrodes, transistors and the like.

It is envisaged that the teaching aid acording to the present invention may be readily adapted to the teaching of biology. In this case the discs would be cut out to the same shapes as parts of the body or a plant. Each disc would be constructed substantially as hereinbefore described with the necessary outline of the body or plant drawn accurately thereon.

It is also envisaged that a sheet of flexible material may be so provided for interposition between the display board and the disc. For example in the teaching of biology the outline of the body, or of a plant could be printed thereon. in use this polythene sheet will be placed over the display board and the various discs attached to the display board with the sheets of flexible material interposed between. It will be appreciated that a body system such as the digestive system can be accurately, quickly and simply assembled over an outline of a body.

An alternative embodiment of the invention envisages the provision of a teaching aid, said teaching aid being adapted for the teaching of geography in which each disc is so formed as to have the shape of or a symbol printed thereon indicating a mountain, city, town, industry, agriculture and the like. Again sheets of material are preferably provided for interposition between the display board and the discs, said sheet of material being provided with a permanent outline for example of a country, continent or the like. Preferably the sheet would be a sheet of transparent polythene material in this case the teacher may during the teaching draw rivers, roads, railways on the polythene sheet using some form of suitably easily erased writing implement.

It is also envisaged that the teaching aid according to the present invention may be adapted for the teaching of other subjects for example history. In this case the disc could for example be in the shape of or so adapted to represent cavalry, infantry, artillery, supplies, ships and other items of interest. This will be readily apparent from the previous description.

Similarly, it is envisaged that the teaching aid according to the present invention could be adapted for the teaching of music. The discs now take the form of musical symbols and the sheets of material are so provided so as to have a plurality of parallel lines printed thereon.

It will be readily apparent that the apparatus according to the present invention may be easily adapted to the teaching of many subjects.

The invention is not limited to the teaching of those subjects hereinbefore mentioned.

I claim:

1. A teaching aid comprising:
a display board;
a circular disc having a symbol printed thereon;
means for attaching said disc to said board;
said display board and said disc being comprised of magnetic material, said circular disc being held to said display board by magnetic means, said disc having a chemical symbol printed thereon; at least one ring held on said disc and surrounding said disc, said ring having a cut-out embracing said circular disc, said ring having a concentric circle printed thereon and having holes, pins inserted into said holes for denoting electrons in orbit, said disc comprising a magnet and cooperating with said ring for displaying possible chemical structures of compounds, said ring displaying electrons in orbit about said disc, said disc corresponding to the nucleus of an atom.

2. A teaching aid comprising: a display board; a disc having a symbol printed thereon; means for attaching the disc to the board; said disc being of a shape which is selected from the symbols consisting of those having atomic, ionic, biological, geographical, historical and musical significance; additional discs in the form of rings, each of said rings having a cut-out inner portion for embracing the circular disc, each of said rings having a concentric circle printed thereon and holes for the reception of pins, said holes showing in conjunction with the concentric circles the occupancy of various rings about an atom.

* * * * *